United States Patent Office 2,845,952
Patented Aug. 5, 1958

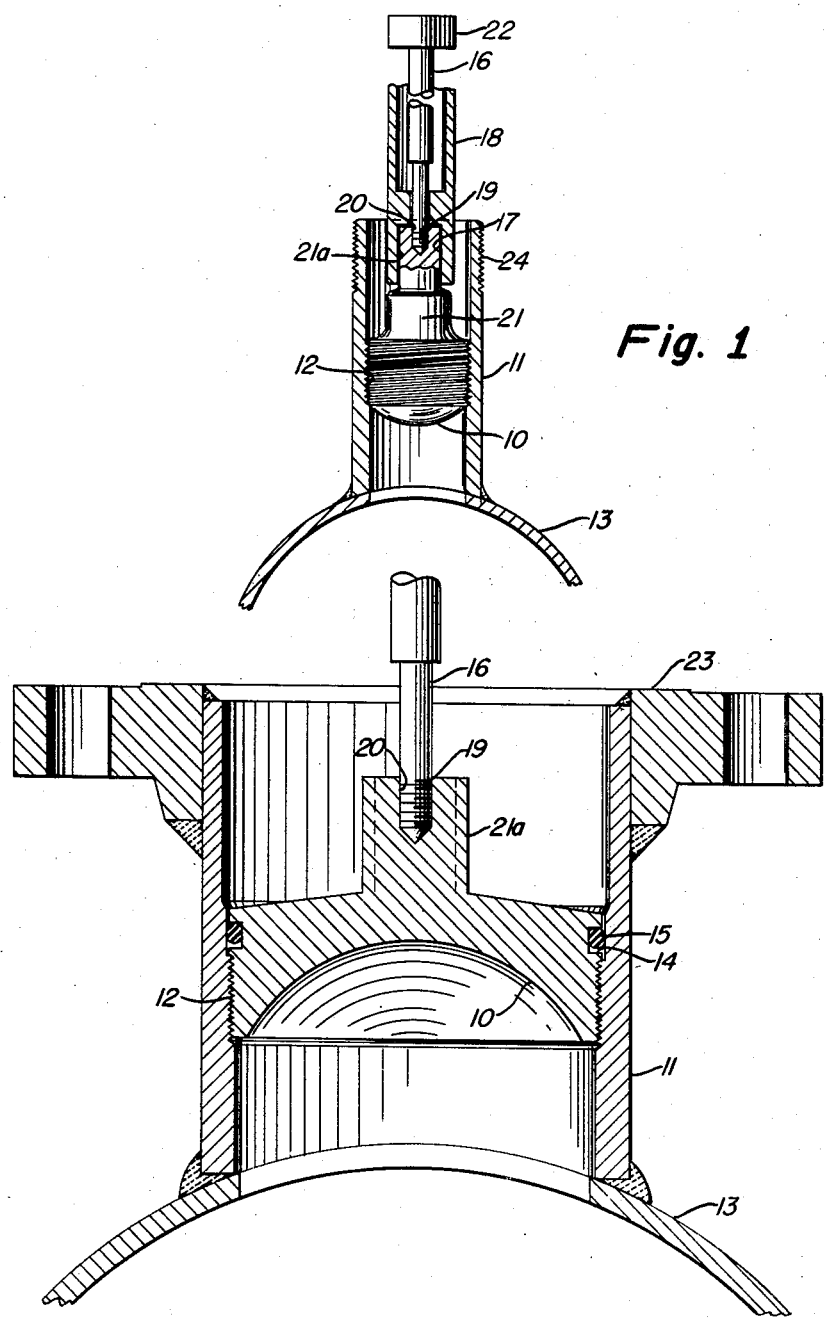

2,845,952
NIPPLE PLUGGING DEVICE

Arthur M. Hill, Tulsa, Okla., assignor to Service Pipe Line Company, Tulsa, Okla., a corporation of Maine Application April 20, 1954, Serial No. 424,336

4 Claims. (Cl. 138—89)

This invention relates to pipe tapping and plugging apparatus and, more particularly, relates to an improved plug for use with such apparatus.

In tapping and plugging a pipe or vessel, a tapping nipple or connector is welded to the pipe or vessel wall. A gate valve is fixed to the connector and the pipe tapping and plugging apparatus, is, in turn, attached to the top of the gate valve housing. The tapping cutter then may be operated through the open gate valve without loss of fluid or pressure from the pipe line or vessel when the tapping is completed. Upon completion of the cutting operation, the cutter is withdrawn from the connector and from the gate valve which is then closed. The apparatus is removed and the pipe plug, according to my invention, is substituted for the cutter assembly on the boring bar of the pipe tapping mechanism which is again connected to the top of the gate valve housing. The gate valve is re-opened and the plug lowered into place for closing the connector.

The present invention, although related to the pipe tapping mechanism, is more concerned with the structure of the plug body. Accordingly, the tapping operation and mechanism will not be described in more detail. However, this application is a continuation-in-part of my co-pending application Serial Number 103,781, filed July 9, 1949, and entitled Pipe Tapping Machine, now issued as United States Patent 2,679,173. Further details of the cutter and boring bar mechanism are found therein.

An object of the invention is to provide a new and improved apparatus for plugging a pipe containing fluid under pressure without the loss of the fluid. A further object of the invention is to provide an improved plug which is interchangeable with a cutter head on a pipe tapping device. Another object is to provide a plug adapted for sealing welded pipe nipples or connectors which may become distorted during the welding operation. These and other objects of my invention will become apparent as the description thereof proceeds.

My invention will best be understood by reference to the accompanying drawing wherein corresponding elements are designated by like reference characters and in which:

Figure 1 is an elevation, partly in section, of a tubular pipe connector showing one embodiment of my threaded plug in place; and Figure 2 is an elevation, partly in section, of a tubular connector showing a threaded plug equipped with an O-ring gasket.

The plug 10 and outlet connector 11 of Figure 1 use standard pipe thread 8-pitch with 0.25 inch taper per foot and complete make-up of the threads 12 on the plug 10 with those in the tapping connector 11 prevents leakage.

Tapping connectors and plugs with such standard pipe threads are satisfactory in the 2, 3 and 4 inch sizes. However, in the larger sizes heat from welding the tapping connector onto the pipe line frequently causes distortion and the connector may be drawn out of round as much as 0.030 inch. With this distortion it becomes very difficult to accomplish a complete make-up of the threads on the plug with those in the tapping connector and, accordingly, leakage may occur through the threads.

To overcome such difficulties, I have devised the improved plug illustrated by Figure 2 for use on 6, 8, 10 and 12 inch sizes. In this embodiment, straight 8-pitch threads are used on the plug 10 and within the tapping connector 11. Sufficient clearance is provided in the straight thread to complete engagement of the threads without undue stress from any distortion which takes place when the tapping connector 11 is welded to the pipe line 13. A channel 14 in the body of the plug 10 above the threads 12 accommodates an O-ring gasket 15 which provides a seal between the plug body and the nipple wall to prevent leakage.

To place the plug 10, a steel rod or retainer shaft 16 telescopes within the feed screw and through the stuffing box in the tapping machine (not shown) into the drive socket 17 at the lower end of a boring bar 18. Threads 19 on the lower end of the retainer 16 engage the internal threads in the bore 20 in the shank 21a of the plug 10 to provide positive engagement of the plug stem 21 with the socket 17 of the boring bar 18 during the drilling and plugging operations.

The stem 21 is provided with a shank 21a which contains a drilled and tapped bore 20 extending longitudinally into the shank 21a and is adapted to engage the threads 19 on the retainer 16. The illustrated embodiment of the present invention utilizes a square socket 17 in boring bar 18 and a squared shank 21a on the stem 21 of the plug 10 with a drilled and tapped longitudinal bore 20 in stem 21 to receive the plug retainer shaft 16. In place of such symmetrically non-circular shank 21a, I may provide the stem 21 with a tapered shang 21a having splines of drive keys, in which case the socket 17 in the boring bar 18 is provided with matching internal splines or drive slots.

When the tapping operation has been completed, the shell cutter and boring bar are withdrawn as a unit and the gate valve (not shown) is closed. The shell cutter assembly is disengaged from the retainer 16 and withdrawn from the square socket 17. The plug shank 21a is then inserted into the socket 17 and threaded to the plug retainer 16 by turning the upper end of the retainer 16 which is provided with a socket wrench engaging means 22. Thus, when inserting or removing the plug 10 from the tapping connector 11, the square shank 21a of the plug 10 is held firmly within the socket 17 of the boring bar 18 as shown in Figure 1.

The tapping mechanism is fluid- and pressure-tight and the boring bar 18 with the plug 10 held securely within the socket 17 can be lowered through the gate valve and into the pipe connector 11 without fluid or pressure loss. The threaded plug 10 is then fixed to the internal threads 12a within the connector 11 by rotation of the boring bar 18.

With the plug 10 securely in place in the connector 11, the plug retainer 16 is removed. This is done by turning out the retainer shaft 16 while the squared shank 21a is held by the squared socket 17 in the lower end of the boring bar 18. Having thus released the plug retainer 16, the boring bar 18 (and socket 17) are withdrawn through the valve housing (not shown). Finally, the tapping mechanism or tool is removed from the gate valve flange and, if desired, the gate valve itself can be disengaged from the connector 11 and the connector capped.

When the driving mechanism is later used to remove the so-installed plug 10, the gate valve is replaced and the boring bar 18 is extended therethrough and rotated slowly until the socket 17 slips over the shank 21a on the plug 10. The plug retainer 16 is then introduced and threaded into the shank 21a of the plug 10 whereby it is held firmly in the socket 17 of the boring bar 18 to prevent its being accidently dropped when being retracted through the gate valve. The gate valve can then be closed and a branch line attached to the valve.

Although I have described my invention in connection with specific embodiments thereof, it is to be understood that these are by way of illustration only and that my invention is not limited thereto. For example, the plugs illustrated herein may be fixed to connectors by means other than the pipe tapping device described in my co-pending application. Likewise, this type of plug may be used in various types of vessels and industrial piping systems which will occur to those skilled in the art. It is further contemplated that modifications can be made in the structure and mode of use of structure by those skilled in the art without departing from the spirit of my invention described herein.

What I claim is:

1. In an apparatus for plugging a pipe, the improvement which comprises in combination a boring bar, a squared socket in the lower end of said boring bar, a longitudinal bore extending through the base of said socket, an externally threaded body, a squared stem extending axially of said body and adapted to enter said socket, a longitudinally extending drilled and tapped axial bore wholly within said stem, and a retaining shaft slidably extending through said longitudinal bore and into said socket for threaded engagement with the said axial bore in said stem.

2. In an apparatus for installing a threaded plug in an outlet connector of a vessel under pressure where said plug has spline means for engagement of a driving tool and an axially threaded hole, the combination comprising a bar, spline means at one end of said bar to engage said spline means of said plug and to rotate said plug, pressure seal means between said outlet connector and said bar, an axial bore through said bar, and retainer means including a shaft extending through said bore and threads on one end of said shaft adapted to engage said plug by said axially threaded hole to hold said plug as said plug is installed in said outlet connector.

3. In an apparatus for installing a threaded plug in an outlet connector in a vessel under pressure where said plug has spline means for engagement of a driving tool and axial locking means for engagement of a retainer means, the combination comprising a bar, spline means at one end of said bar to engage said spline means of said plug and to rotate said plug, pressure seal means between said outlet connector and said bar, an axial bore through said bar, retainer means extending through said axial bore, and means on the end of said retainer means to releasably engage said locking means and hold said plug in engagement with said bar as said plug is being installed in said outlet connector.

4. In an apparatus according to claim 3 wherein said axial locking means of said plug comprises a threaded hole, the combination including threads on the end of said retainer means adapted to engage said threaded hole to hold said plug as said plug is installed in said outlet connector.

References Cited in the file of this patent

UNITED STATES PATENTS

| | | |
|---|---|---|
| 2,077,507 | Yancey | Apr. 20, 1937 |
| 2,118,376 | Dutch | May 24, 1938 |
| 2,187,838 | Penick et al. | Jan. 23, 1940 |
| 2,250,244 | Yancey | July 22, 1941 |
| 2,476,907 | Preston et al. | July 19, 1949 |
| 2,517,870 | Gump | Aug. 8, 1950 |
| 2,679,173 | Hill | May 25, 1954 |

FOREIGN PATENTS

| | | |
|---|---|---|
| 571,261 | Great Britain | Aug. 14, 1945 |